(12) United States Patent
Griffin et al.

(10) Patent No.: US 8,620,882 B2
(45) Date of Patent: Dec. 31, 2013

(54) TOKENIZATION OF MULTIPLE-FIELD RECORDS

(75) Inventors: Robert W. Griffin, Hollis, NH (US);
Daniel Bailey, Pepperell, MA (US);
Joshua Rosenthol, Centreville, VA (US)

(73) Assignee: EMC Corporation, Hopkinton, MA (US)

( * ) Notice: Subject to any disclaimer, the term of this patent is extended or adjusted under 35 U.S.C. 154(b) by 229 days.

(21) Appl. No.: 12/980,421

(22) Filed: Dec. 29, 2010

(65) Prior Publication Data

US 2012/0173563 A1  Jul. 5, 2012

(51) Int. Cl.
*G06F 17/30* (2006.01)

(52) U.S. Cl.
USPC ........... 707/694; 707/784; 709/203; 709/219; 709/229

(58) Field of Classification Search
USPC .......... 707/687, 694, 783, 784; 709/203, 218, 709/229
See application file for complete search history.

(56) References Cited

U.S. PATENT DOCUMENTS

| | | | |
|---|---|---|---|
| 4,700,976 A * | 10/1987 | Loose | 283/101 |
| 5,651,069 A * | 7/1997 | Rogaway | 380/28 |
| 6,523,116 B1 | 2/2003 | Berman | |
| 6,691,113 B1 * | 2/2004 | Harrison et al. | 1/1 |
| 7,092,891 B2 | 8/2006 | Maus et al. | |
| 7,647,320 B2 * | 1/2010 | Mok et al. | 707/770 |
| 7,748,032 B2 * | 6/2010 | Simmons | 726/10 |
| 7,865,735 B2 | 1/2011 | Yiachos | |
| 2003/0217288 A1 * | 11/2003 | Guo et al. | 713/201 |
| 2004/0015701 A1 | 1/2004 | Flyntz | |
| 2008/0120302 A1 | 5/2008 | Thompson | |

FOREIGN PATENT DOCUMENTS

WO  2006/014842 A2  2/2006

OTHER PUBLICATIONS

"Luhn algorithm" wikipedia.com as taken from wikipedia history Apr. 21, 2004.*

* cited by examiner

*Primary Examiner* — Hosain Alam
*Assistant Examiner* — Bruce Witzenburg
(74) *Attorney, Agent, or Firm* — BainwoodHuang

(57) ABSTRACT

An improved technique for granting access to a complex datum maps a single user token representing a user onto a set of data group tokens, each data group token providing access to a data group stored on a storage medium. The improved technique combines the centralization of the complex datum while providing the security of tokenization and will lower the risk of a rogue third party gaining unauthorized access to the user's records stored across the data groups.

17 Claims, 5 Drawing Sheets

TOKENIZATION OF MULTIPLE-FIELD RECORDS

BACKGROUND

A token is a bit string used to represent an original bit string which carries sensitive data. The original bit string can be represented by, e.g., a string of decimal numerals or letters to an authorized user and the sensitive data can take the form of, e.g., a credit card number, a social security number, etc.

A token can protect sensitive data like a credit card number because a token is meaningless to someone not authorized to access the sensitive data it is representing. The record of the mapping between a token and the data it protects is kept on a secure system known as a tokenization server. For example, a merchant accepting a credit card for payment does not wish to keep the credit card number stored on a local, unsecured system from which an unauthorized party may access the credit card number. Rather, the merchant sends the credit card number to a secure system which assigns a token to the credit card number, stores the credit card number and its token in a database for future lookup, and sends the token to the merchant. This way, the merchant can track consumer behavior without using sensitive data.

For an authorized party to access the sensitive data stored on the secure system, the authorized party may have to present identifying information to an access control manager, e.g., username/password combination. In this case, the secure system receives a request from the authorized party whose credentials have been established by the access control manager for the sensitive data corresponding to a token. The secure system, e.g., performs a lookup on the token, retrieves the sensitive information and sends the sensitive information to the authorized user.

SUMMARY

Conventional systems for protecting sensitive data map a single token onto a single piece of sensitive data. For each piece of sensitive data, there is a single owner. For example, a merchant will have a different token for each credit card number used. The owner of the credit card data in this case is the merchant. The secure system maintains a list of credit card numbers and tokens associated with each credit card number. Because there is a one-to-one correspondence between the token and the sensitive data, and the sensitive data is stored on the secure server, data such as credit card numbers can be considered as simple data.

Complex data such as a patient's medical history, on the other hand, has data corresponding to different fields of the medical history stored in disparate locations such a different medical departments in possibly different hospitals. A challenge of applying tokenization technology to protecting such complex data is that there is more than one owner of the data. That is, it may not be feasible to store the data from the different fields on a secure server which maps the data onto a single token.

An improved technique, however, controls access to multiple data groups of a complex datum by mapping a single user token representing a user onto a set of data group tokens, each data group token providing access to a data group stored on a storage medium outside of a secure token server. The improved technique replaces the direct mapping of a token to a simple datum on the secure server with a mapping of a token to a set of data group tokens, each data group token representing a data group of a complex datum and being stored on a system external to the secure server. For example, consider the case of the complex datum representing patient's medical history. In this case, the patient who already has received a user token representing his, e.g., subscriber number submits the user token to a secure token server. Upon receiving the token, the server maps the token to a set of data group tokens each of which represent a data group from the complex datum. The set of data group tokens is sent to the user and the user may use each data group token to gain access to each medical record represented by the data group.

The improved technique is applicable to other complex data pertaining to, e.g., financial records, government systems, etc. For example, consider the case of the complex datum representing an insurance subscriber having multiple policies with an insurer. In this case, the subscriber having a user token representing his, e.g., subscriber number submits the user token to a secure token server. Upon receiving the token, the server maps the token to a set of data group tokens each of which represent a data group from the complex datum. The set of data group tokens is sent to the user and the user may use each data group token to gain access to each insurance policy represented by the data group.

One embodiment of the improved technique is directed to a computer-implemented method of controlling access to a complex datum. The method includes receiving, from a client computer over a network, a user token uniquely corresponding to and suppressing the identity of a user at the client computer. The method also includes mapping the user token to a set of data group tokens, each data group token in the set of data group tokens corresponding to a data group in the set of data groups and defining a level of access the user has to that respective data group. The method further includes sending the set of data group tokens to the client computer over the network.

Additionally, some embodiments of the improved technique are directed to a system configured to control access to a complex datum. The system includes a network interface coupled to a network, a memory and a processor coupled to the memory, the processor configured to carry out the method of controlling access to a complex datum.

Furthermore, some embodiments of the improved technique are directed to a computer program product having a non-transitory computer readable storage medium which stores code including a set of instructions to carry out the method of controlling access to a complex datum.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique controls access to multiple data groups of a complex datum by mapping a single user token representing a user onto a set of data group tokens, each data group token providing access to a data group stored on a storage medium outside of a secure token server. The improved technique replaces the direct mapping of a token to a simple datum on the secure server with a mapping of a token to a set of data group tokens, each data group token representing a data group of a complex datum and being stored on a system external to the secure server. For example, consider the case of the complex datum representing patient's medical history. In this case, the patient who already has received a user token representing his, e.g., subscriber number submits the user token to a secure token server. Upon receiving the token, the server maps the token to a set of data group tokens each of which represent a data group from the complex datum. The set of data group tokens is sent to the user and the user may use each data group token to gain access to each medical record represented by the data group.

Figure 1:
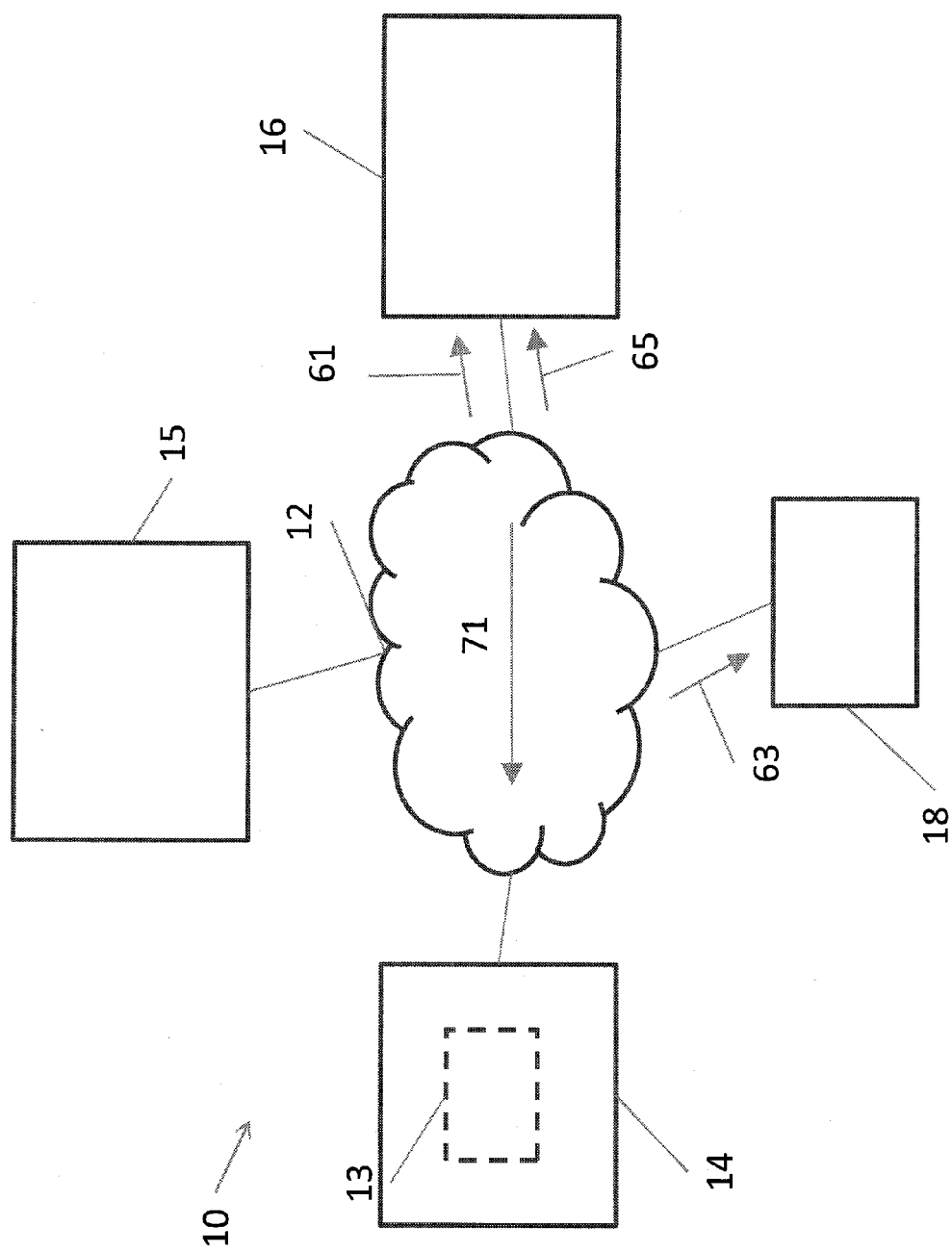
FIG. 1 is a block diagram of an electronic environment which is constructed and arranged to control access to a complex datum.

FIG. 1 shows an electronic environment 10 which utilizes a single token to access a complex datum which has multiple data groups, each of which has data stored in an external storage medium. Electronic environment 10 includes communication medium 12, client computer 14, external storage medium 15 and token server 16. In some arrangements, electronic environment 10 includes access control manager 18.

Communication medium 12 provides connections between client computer 14 and token server 16. Communication medium 12 includes a public network, for example, the Internet.

Client computer 14 is configured to run software, e.g., a small database 13, which allows a user to map Personally Identifiable Information (PII) onto a user token 61. A user on client computer has a user token 61 which, in some arrangements, is stored locally and accessed with access control manager 18 using, e.g., a username/password combination.

Token server 16 is configured to receive user token 61 from client computer 14, map user token 61 to a set of data group tokens 71 and send the set of data group tokens 71 to client computer 14. In some arrangements, token server 16 includes a storage medium 11 which stores a database containing a list of user tokens.

External storage medium 15 stores data associated with the complex datum. Details of external storage medium 15 will be provided in the discussion below with Reference to FIGS. 3 and 4.

During operation, token server 16 receives a user token from a user on client computer 14, the user submitting the user token in order to gain access to records of a complex datum. Token server 16, upon receiving user token 61, maps user token 61 onto a set of data group tokens 71. Each data group token 71 in the set of data group tokens 71 represents data stored in external storage medium 15 and defines a level of access the user has in accessing a particular field of the complex datum. The set of data group tokens 71 is then sent to client computer 14.

Because tokens are used to represent both a user and multiple fields of a complex datum, there is a very low risk that an unauthorized party can get a complete picture of the information contained in the complex datum. For example, if the complex datum represents a patient's medical record, then unauthorized access of the medical record will reveal tokenized data where sensitive information such as, say, a patient's insurance number would be. That is, it becomes very difficult to map a particular patient to, say, sensitive medical information. Further, if each data group represents, say, a different medical department (e.g., cardiology, hematology, etc.), then having a different token for each medical department compartmentalizes sensitive information and further prevents unauthorized parties from getting access to sensitive information (e.g., hematology getting access to cardiology without prior authorization).

Additional details of how token server 16 obtains data group token 69 via database 40 will be explained below with regard to FIG. 2.

Figure 2:
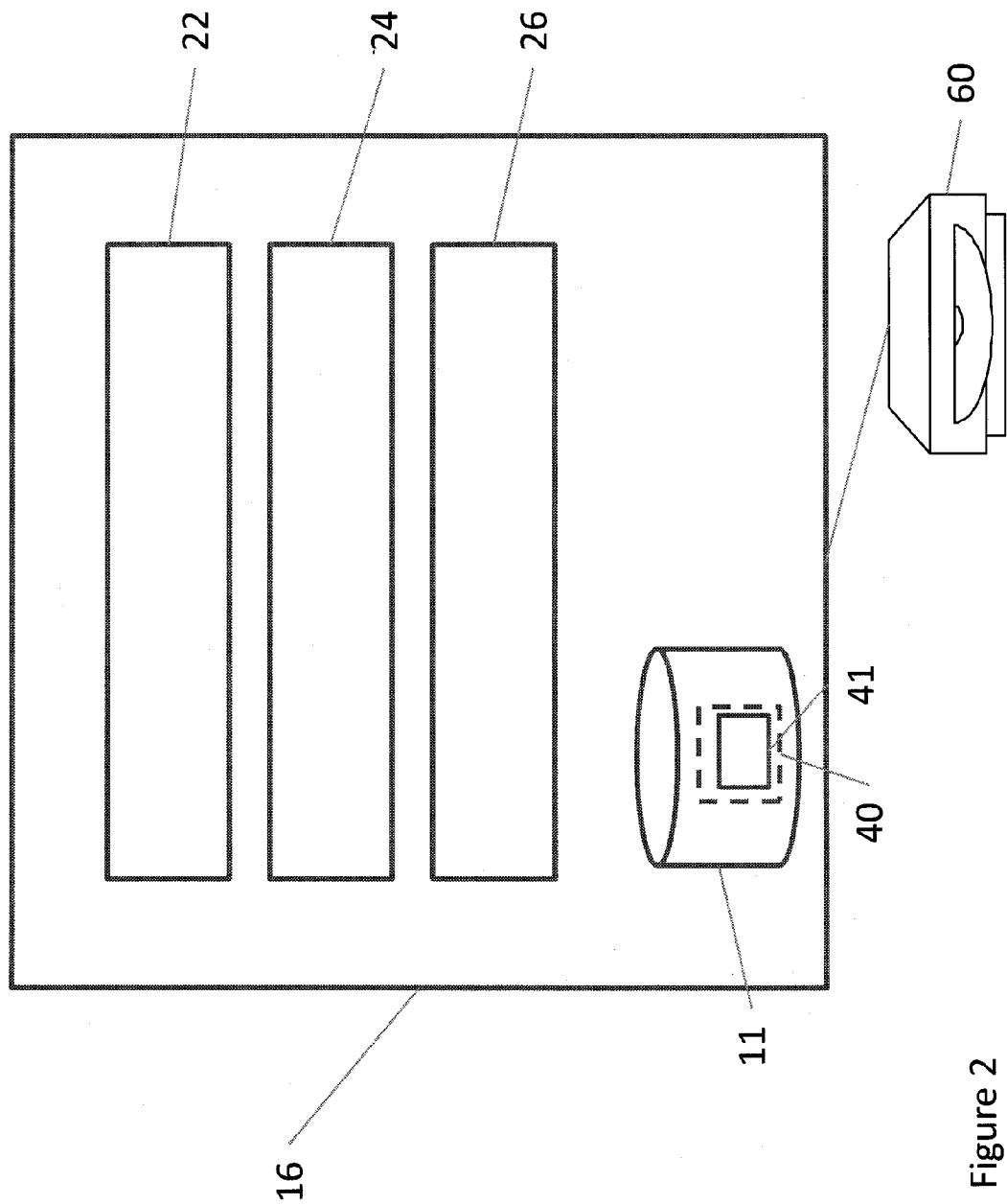
FIG. 2 is a block diagram showing particular details of a server within the electronic environment of FIG. 1 on which a user token is mapped to a set of data group tokens.

FIG. 2 shows further detail of the token server 16. Token server 16 includes processor 22, memory 24 and network interface 26.

Memory 24 is configured to store a computer program 60 which is constructed and arranged to map user token 61 representing a user onto the set of data group tokens 71 [See FIG. 1].

Processor 22 can take the form of, but is not limited to, an Intel or AMD-based MPU, and can be a single or multi-core running single or multiple threads. Processor 22 is coupled to memory 24 and is configured to execute the computer program 60 stored in memory 24. Processor 22 is further configured to perform lookup operations in database 40.

Network interface 26 is configured to receive user token 61 from client computer 14 and send set of data group tokens 71 back to client computer 14.

In some arrangements, token server 16 includes storage medium 11, which stores database 40. Database 40 includes a lookup table 41 containing a set of user tokens 32 and a set of index values 34 [see FIG. 3].

During operation, network interface 26 receives user token 16. Upon receipt of user token 16, processor 22 receives instructions from memory 24 to map user token 61 to set of data group tokens 71. Processor 22 then processes instructions to send set of data group tokens 71 to client computer 14 through network interface 26.

In some arrangements, processor 22 locates user token 61 in database 40. Once user token 61 is located, a corresponding index value is determined from the lookup table 41. From the index value, processor 22 obtains set of data group tokens 71. For example, the processor 22 can use the index value to partition the user token 61 in such a way as to produce the set of data group tokens 71. In this way, a single token can represent a complex datum having multiple data groups.

In the description that follows in FIGS. 3 and 4, the derivation of a user token 61 and a corresponding index value will be discussed in some detail. For simplicity, it will be assumed that the complex datum is a patient's medical history and that a user on client computer 14 is attempting to access at least some medical records pertaining to the medical history. Nevertheless, the concepts contained in the discussion are valid for other complex data pertaining to, e.g., financial records, government systems, etc.

Details pertaining to how a user token 61 is mapped to a set of data group tokens 71 depend on the nature of the medical history. For example, the medical history to be obtained may be confined to various departments of a single medical institution [e.g., a hospital or clinic] in the case of a physician looking up information pertaining to a patient under his or her care. The medical institution has many departments [e.g., cardiology, nephrology, etc.], each of which may or may not be authorized to share information with each other. On the other hand, a patient may be interested in his or her own medical history which is spread over many institutions, each of which have multiple departments, each department may or may not having authorization to share information with each other.

Figure 3:
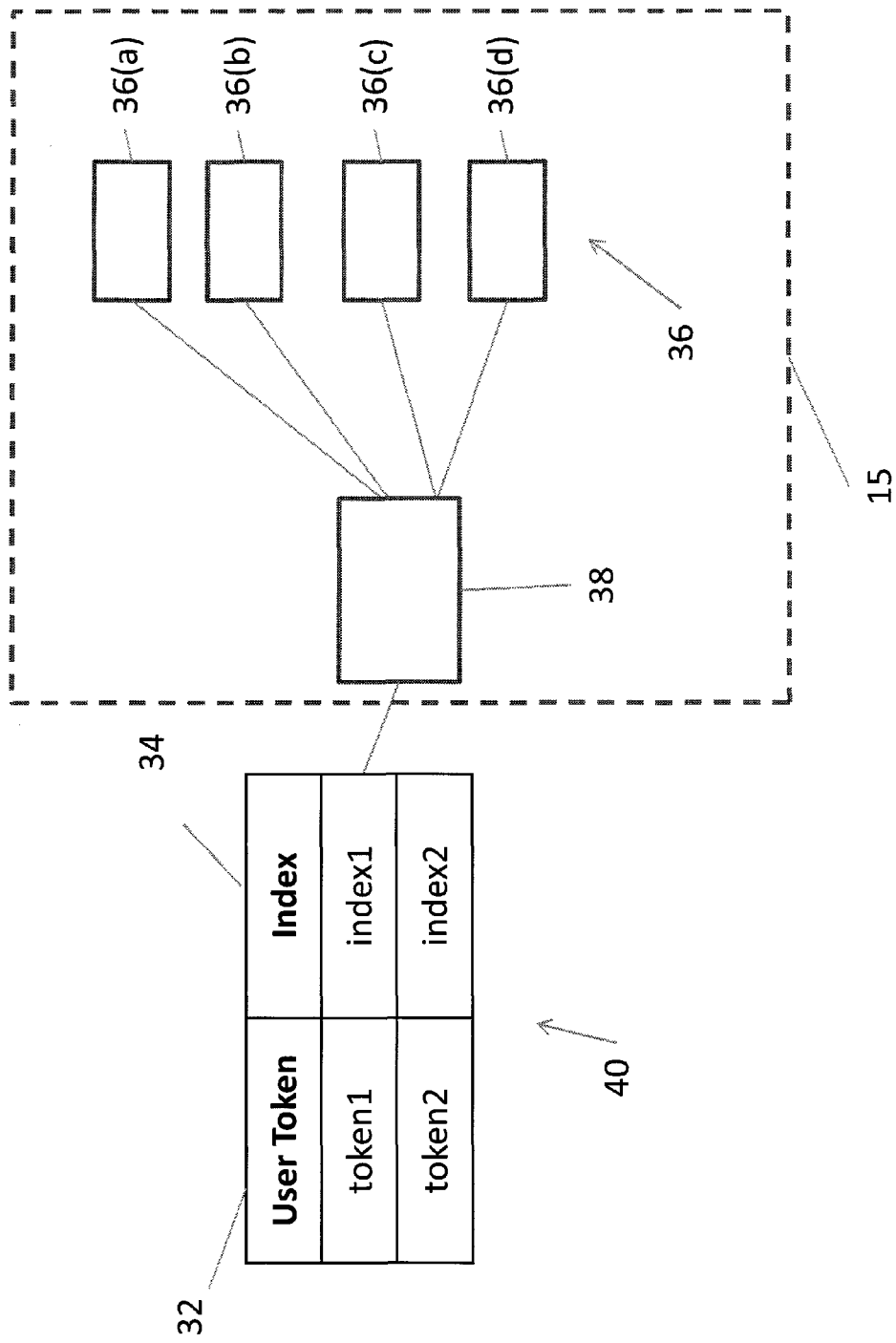
FIG. 3 is a block diagram of system within the electronic environment of FIG. 1 in which the server obtains a set of data group tokens from a single hierarchal layer of record locations.

FIG. 3 shows further detail concerning database 40 stored on storage medium 11 on token server 16 for the case of a physician looking up information pertaining to a patient under his or her care within a single institution 36. Database 40 includes a lookup table containing a user token field 32 and an index value 34 containing a list of index values associated with each user token from user token field 32.

During operation, token server 16 receives data group tokens from medical departments 36(a), 36(b), 36(c) and 36(d) through remote server 38. Remote server 38 contains mapping information to each medical department 36 so that when a data group token is submitted to institution 36 via remote server 38, the data group token is routed to the medical department 36 containing the medical record corresponding to the data group token. Note that external storage medium 15 encompasses medical departments 36(a), 36(b), 36(c), 36(d) and remote server 38.

In order to achieve the correct routing, remote server 38 sends a pointer corresponding to the data group token to token server 16 along with the data group token. When all data group tokens corresponding to a patient are collected at token server 16, the pointers are combined according to a predetermined rule and converted to a bit string which becomes an index value corresponding to the patient. The index value then determines how the resulting set of data group tokens 71 are combined into a single user token 61 which is sent to client computer 14. Thus, the single user token 61 can be mapped to set of data group tokens 71 by token server 16 by using the rules embedded in the index value associated with the user token 16.

When the physician at client computer desires access to patient data, the physician send a user token 61 corresponding to the patient whose data he or she wishes to access. The user token 61 is then found in lookup table 41 on database 40 and it corresponding index value retrieved. Data partitioning techniques are then used by processor 22 to break user token 61 into set of data group tokens 71 using the index value. Set of data group tokens are then sent to client computer 14 by processor 22.

In some arrangements, the physician is a research physician conducting a clinical trial in which the identity of the patient is to be kept secret. In this case, token server 16 can add a flag bit denoting whether the user at client computer 14 has an authorization to see the patient's name as part obtaining the medical record. Specifically, the bit can be sent to access control server 18 which can manage the access control of the various fields of the user.

Figure 4:
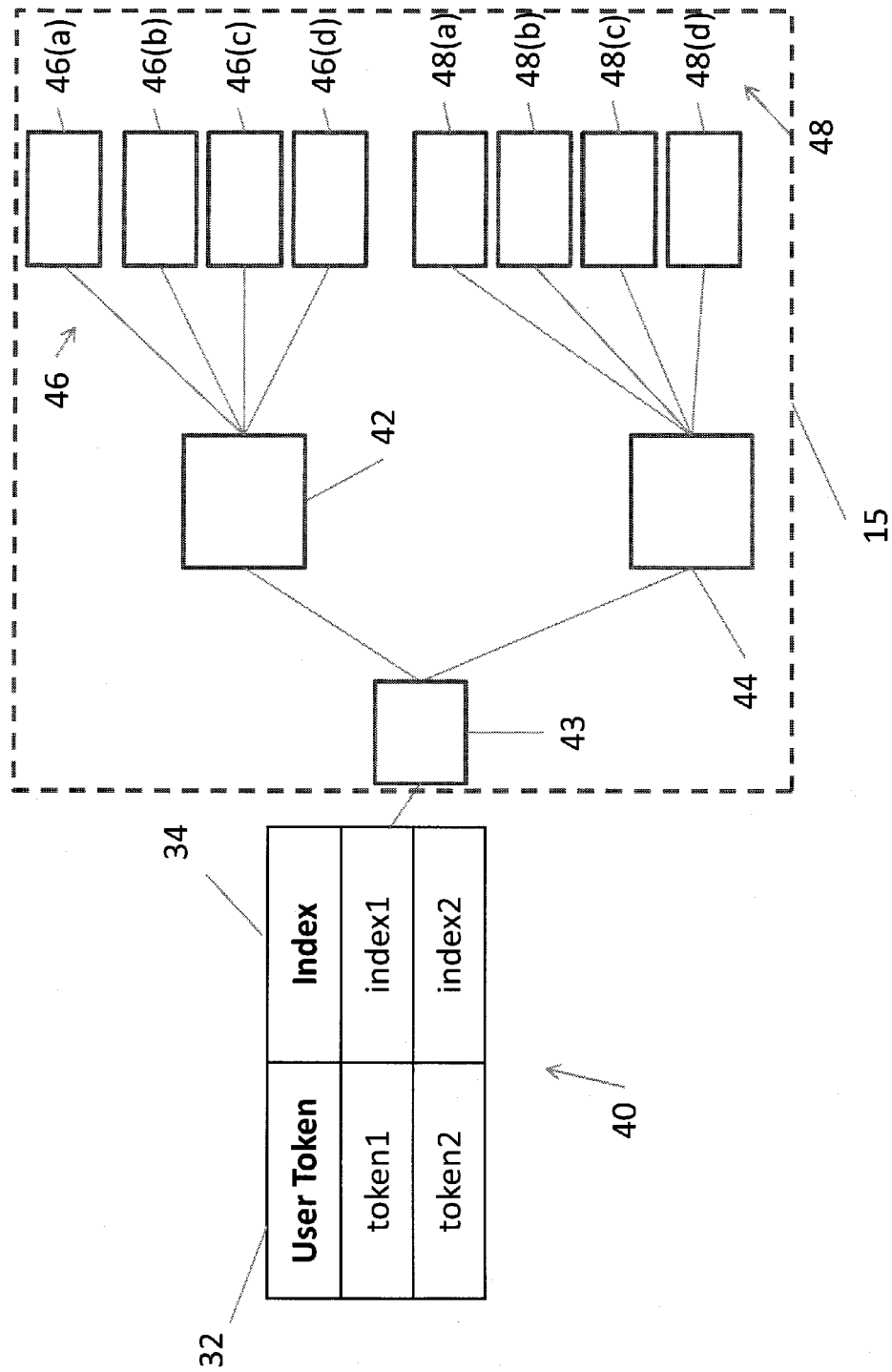
FIG. 4 is a block diagram of system within the electronic environment of FIG. 1 in which the server obtains a set of data group tokens from a double hierarchal layer of record locations.

FIG. 4 is similar to FIG. 3 but shows the case where the patient is interested in accessing parts of his or her own medical history which is spread over many institutions, each of which have multiple departments, each department may or may not having authorization to share information with each other.

During operation in this case, token server 16 receives data group tokens from medical institutions 42 and 44 via remote server 43. Remote server 43 contains mapping information to each medical institution so that when a data group token 71 is submitted via remote server 43, the data group token 71 is routed to the medical institution containing the medical record corresponding to the data group token 71. In order to achieve this correct routing, remote server 43 sends a pointer corresponding to the data group token 71 to token server 16 along with the data group token 71. When all data group tokens 71 corresponding to a patient are collected at token server 16, the pointers are combined according to a predetermined rule and converted to a bit string which becomes an index value corresponding to the patient. The index value then determines how the resulting set of data group tokens 71 are combined into a single user token 61 which is sent to client computer 14. Thus, the single user token 61 can be mapped to set of data group tokens 71 by token server 16 by using the rules embedded in the index value associated with the user token 16.

Nevertheless, the patient's records are stored within various departments 46(a), 46(b), 46(c) and 46(d) and 48(a), 48(b), 48(c) and 48(d) of medical institutions 46 and 48, respectively. Thus if the patient wishes to locate a medical record in one of the departments of the medical institutions, an additional tokenization layer is necessary. That is, a data group token 71 as constructed to route a request for a medical record to the correct medical department within the correct medical institution will possess a hierarchal structure as a token of tokens. Each medical institution then includes a remote server which provides the mapping of a data group token to a particular medical department.

While having the single token representing a complex datum as described above is a secure way of controlling access to the compartmentalized information in the various data groups, sometimes additional security measures may be needed. In most cases, the user at client computer 14 needs to identify himself or herself to some recognized authority in order to gain access to the sensitive information. In some arrangements, then, electronic environment 10 includes access control manager 18. Access control manager 18 is constructed and arranged to verify the identity of the user at client computer 14. For example, a user submits a user token 61 to token server 16 in order to obtain set of data group tokens 71. Nevertheless, in order to use data group tokens 71, the user needs to verify an identity with a remote computer in possession of medical records to be obtained with a data group token. Access control manager 18 receives identity information 63 from the user (e.g., username password, OTP, etc.). If access control manager verifies the identity information 63, access control manager 18 sends an authorization message 65 to the remote computer 38 (see FIG. 3) holding the medical record of interest.

In still other arrangements, each data group token in the set of data group tokens 71 includes information relating to an expiration time beyond which a level of access the user at client computer 14 has with regard to the medical record corresponding to a data group token change. In this case, processor 22 checks the expiration time against a current time and, if the current time is later than the expiration time, the processor sends a message via network interface 26 to access control manager 18. Access control manager 18 then verifies through, e.g., a database, whether the user is still authorized to view the medical record. If the user is no longer authorized to view the medical record, the access control manager 18 sends a message to token server 18 to not send the data group token to client computer 14. This process may be repeated over all data group tokens in the set of data group tokens 71.

In still further arrangements, security of the sensitive data is enhanced by having a user at client computer 14 being able to determine if a given data group token is a valid token. Because a token [user token 61 or data group token 71] is a bit string or a set of bits, a token can be made to satisfy certain mathematical constraints. For example, some bit strings that are derived from a decimal numeral string [e.g., a credit card number] contain a check digit computed using the Luhn algorithm. That is, a decimal numeral string, when subjected to the Luhn algorithm, needs to be, e.g., congruent modulo some prespecified number. A number resembling a decimal numeral string that did not satisfy such a congruence upon application of the Luhn algorithm would be identified as an invalid number.

A more effective way to check on the validity of a token is for processor 22 to add a set of message authentication code (MAC) bits to the token. The values of the bits in the set of MAC bits are set so that only an authorized user of client computer 14 can determine whether a token is a valid token. To with, processor 22 sets the values of the bits in the set of MAC bits according to a hash function applied to the set of bits in the original token. In order for this scheme to work, both the token server 16 and client computer 14 need to possess the same hash function. Thus, before the sending of the token to client computer 14, token server 16 sends the hash function to client computer 14. When token server 16 sends a token to client computer 14 [amended so as to include the MAC bit string], client computer 14 decomposes the amended token into the original bit string and the MAC bit string. If upon an operation of the hash function onto the original bit string the resulting bit string is identical to the MAC bit string, then the token is valid. The user on client computer 14 can use the original token to obtain the sensitive data.

In still further arrangements, the hash function is a keyed has function token server 16 possesses a cryptographic key. Token server 16 sends the cryptographic key to client computer over a secure connection. Evaluation of the keyed hash function and therefore the values of the bits in the set of MAC bits are virtually impossible without possession of the cryptographic key and security of the sensitive data is enhanced further.

Figure 5:
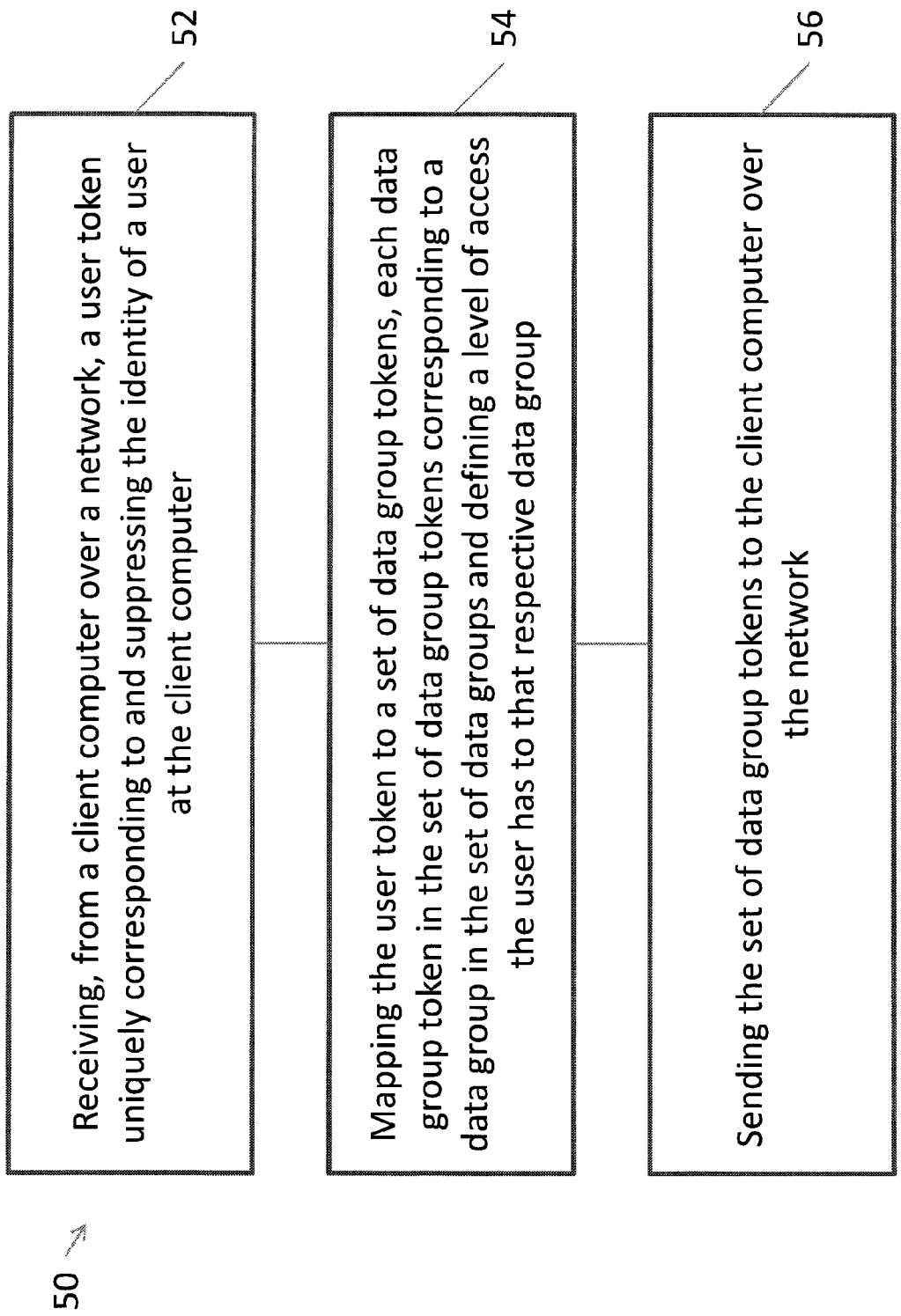
FIG. 5 is a flowchart of a method performed by a system within the electronic environment of FIG. 1.

FIG. 5 shows a method 50 for carrying out the improved technique. In step 52, a user token uniquely corresponding to and suppressing the identity of a user at the client computer is received from a client computer over a network. In step 54, the user token is mapped to a set of data group tokens, each data group token in the set of data group tokens corresponding to a data group in the set of data groups and defining a level of access the user has to that respective data group. In step 56, the set of data group tokens are sent to the client computer over the network.

While various embodiments of the invention have been particularly shown and described, it will be understood by those skilled in the art that various changes in form and details may be made therein without departing from the spirit and scope of the invention as defined by the appended claims.

For example, it should be understood that client computer 14 is a computer system having, for example, a small database. Nevertheless, client 12 can also be a server or a mobile device configured to carry out operations similar to other systems having small databases.

Furthermore, it should be understood that some embodiments are directed to an electronic environment which utilizes systems that protect sensitive data. Some embodiments are directed to token server 16. Some embodiments are directed to a system which performs protection of sensitive data. Some embodiments are directed to a process of protecting sensitive data. Also, some embodiments are directed to a computer program product which enables computer logic to perform protection of sensitive data.

In some arrangements, token server 16 is implemented by a set of processors or other types of control/processing circuitry running software. In such arrangements, the software instructions can be delivered to token server 16 in the form of a computer program product 60 (illustrated generally by a diskette icon 60 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A computer-implemented method of controlling access to a complex datum which includes a set of data groups having data stored on a set of external storage media, the method comprising:
   receiving, by a server from a client computer over a network, a user token representing a user at the client computer;
   mapping, by the server, the user token to a set of data group tokens, each data group token in the set of data group tokens corresponding to a data group in the set of data groups and defining a level of access the user has to that respective data group, each data group in the set of data groups containing data which is stored on an external storage medium from the set of external storage media; and
   sending, by the server, the set of data group tokens to the client computer over the network;
   wherein the server includes a non-volatile memory in which a database is stored;
   wherein the database includes a lookup table containing a set of user tokens and a set of index values, each index value from the set of index values corresponding to a user token in the set of user tokens;
   wherein mapping the user token to a set of data group tokens includes:
     locating the user token in the lookup table,
     finding the corresponding index value from the lookup table, and
     obtaining the set of data group tokens from the corresponding index value;
   wherein the index value corresponding to the user token represents a data partitioning scheme;
   wherein obtaining the set of data group tokens includes partitioning the user token according to the data partitioning scheme represented by the corresponding index value;
   wherein each data group token includes a set of data group token bits;
   wherein the method further comprises:
     sending, before the receiving of the user token, a hash function to the client computer,
     for each data group token, generating a set of message authentication code (MAC) bits from an operation of the hash function on the data group token bits of that data group token, and
     for each data group token, combining the set of MAC bits with the data group token bits of that data group token; and
   wherein an application, at the client computer, of the hash function to a data group token of the set of data group tokens producing the set of MAC bits generated for the data group token implies that the data group token is valid.

2. A method as in claim 1, wherein each data group token includes an expiration time after which the level of access of the user changes; and wherein sending the set of data group tokens to the client computer includes:
  checking a current time against the expiration time; and
  if the current time is later than the expiration time, sending a message to an access control manager connected to the server over the network, the message including a request to change the level of access of the user.

3. A method as in claim 1, wherein the hash function is a keyed hash function which requires a cryptographic key for obtaining the set of MAC bits from the set of index bits in each data group token; and
  wherein the sending, before the receiving of the user token, the hash function to the client computer includes transmitting the cryptographic key to the client computer.

4. A method as in claim 1, wherein the user at the client computer is an entity attempting to access a patient's medical history within a medical institution having a set of medical departments, the medical history including a set of medical records, each medical record in the set of medical records belonging to a medical department;
  wherein each data group token corresponds to a medical departments in the set of medical departments, each medical department having an external storage medium from the set of external storage media storing data associated with the data group represented by the data group token;
  wherein the method further comprises:
    receiving, by the server, from each medical department and before the receiving of the user token from the client computer, a data group token associated with the patient;
    receiving, by the server and from each medical department, a pointer from a set of pointers associated with a location of the external server of the medical department;
    combining the resulting set of data group tokens into the user token according to an index value derived from the received set of pointers, the index value being associated with the resulting user token; and
    sending the resulting user token to the client computer.

5. A method as in claim 4, wherein the combining the resulting set of data group tokens into the user token includes adding a flag denoting whether the entity has authorization to see the patient's name as part of the medical history.

6. A method as in claim 1, wherein the user at the client computer is a patient associated with a medical history including a set of medical records;
  wherein each data group token corresponds to a medical department from a set of medical departments within a medical institution, each medical institution belonging to a set of medical institutions in which the patient has a medical record from the set of medical records, each medical department having an external storage medium from the set of external storage media storing data associated with the data group represented by the data group token;
  wherein the method further comprises:
    receiving, by the server, from each medical institution and before the receiving of the user token from the client computer, a data group token associated with the patient, the data group token being a result of a combination of a set of data group tokens, each data group token from the set of data group tokens corresponding to a medical department belonging to the medical institution;
    receiving, by the server and from each medical institution, a pointer from a set of pointers associated with a location of the external server of a medical department in the medical institution;
    combining the resulting set of data group tokens into the user token according to an index value derived from the received set of pointers, the index value being associated with the resulting user token; and
    sending the resulting user token to the client computer.

7. A method as in claim 1,
  wherein the client computer includes a local database on which the user token is mapped to personally identifiable information (PII) of the user;
  wherein receiving the user token includes:
    obtaining, as the user token, a set of bits from which the PII may only be deduced from locating the bits in the local database, the user token obscuring the PII from users of the server.

8. A method as in claim 7, further comprising:
  prior to receiving the user token, obtaining, from an access control server, an authorization message indicating whether identity information sent to the access control server by the user provides verification of an identity of the user, and
  sending the authorization message to each external storage medium of the set of external storage medium.

9. A method as in claim 1, further comprising:
  sending, to the client computer, a set of constraints satisfied by each data group token of the set of data group tokens, the client computer performing a constraint verification operation on the data group token after the application of the hash function to the set of data group tokens, the constraint verification operation producing a constraint verification result that is indicative of whether the data group token satisfies the set of constraints, the client computer using the data group token when the constraint verification result indicates that the data group token satisfies the set of constraints, the client computer discarding the data group token when the constraint verification result indicates that the data group token does not satisfy the set of constraints.

10. A method as in claim 9,
  wherein the constraint verification operation is a Luhn algorithm; and
  wherein sending the set of constraints to the client computer includes:
    providing a check digit to the client computer, the check digit being configured to enable to client computer to perform, as the constraint verification operation, an application of the Luhn algorithm to the data group token.

11. A system configured to control access to a complex datum which includes a set of data groups having data stored on a set of external storage media, the system comprising:
  a network interface coupled to a network;
  a memory; and
  a processor coupled to the memory, the processor configured to:
    receive, from a client computer over the network, a user token uniquely corresponding to and suppressing the identity of a user at the client computer;
    map the user token to a set of data group tokens, each data group token in the set of data group tokens corresponding to a data group in the set of data groups and defining a level of access the user has to that respective data group, each data group in the set of data groups containing data which is stored on an external storage medium from the set of external storage media; and send the set of data group tokens to the client computer over the network;

wherein a database is stored in the memory, the database including a lookup table containing a set of user tokens and a set of index values, each index value from the set of index values corresponding to a user token in the set of user tokens;

wherein mapping the user token to a set of data group tokens includes:
locating the user token in the lookup table,
finding the corresponding index value from the lookup table, and
obtaining the set of data group tokens from the corresponding index value;

wherein the index value corresponding to the user token represents a data partitioning scheme;

wherein obtaining the set of data group tokens includes partitioning the user token according to the data partitioning scheme represented by the corresponding index value;

wherein each data group token includes a set of data group token bits;

wherein the processor is further configured to:
send, before the receiving of the user token, a hash function to the client computer,
for each data group token, generate a set of message authentication code (MAC) bits from an operation of the hash function on the data group token bits of that data group token, and
for each data group token, combine the set of MAC bits with the data group token bits of that data group token; and wherein an application, at the client computer, of the hash function to a data group token of the set of data group tokens producing the set of MAC bits generated for the data group token implies that the data group token is valid.

12. A system as in claim 11, wherein each data group token includes an expiration time after which the level of access of the user changes; and wherein sending the set of data group tokens to the client computer includes:
checking a current time against the expiration time; and
if the current time is later than the expiration time, sending a message to an access control manager connected to the server over the network, the message including a request to change the level of access of the user.

13. A system as in claim 11, wherein the user at the client computer is an entity attempting to access a patient's medical history within a medical institution having a set of medical departments, the medical history including a set of medical records, each medical record in the set of medical records belonging to a medical department;

wherein each data group token corresponds to a medical departments in the set of medical departments, each medical department having an external storage medium from the set of external storage media storing data associated with the data group represented by the data group token;

wherein the processor is further configured to:
receive, from each medical department and before the receiving of the user token from the client computer, a data group token associated with the patient;
receive, from each medical department, a pointer from a set of pointers associated with a location of the external server of the medical department;
combine the resulting set of data group tokens into the user token according to an index value derived from the received set of pointers, the index value being associated with the resulting user token; and
send the resulting user token to the client computer.

14. A system as in claim 11, wherein the user at the client computer is the patient associated with the medical history;

wherein each data group token corresponds to a medical institution in which the patient has a medical record, the medical institution belonging to a set of medical institutions, the medical record of the patient in the institution belonging to the set of medical records of the medical history, each medical department having an external storage medium from the set of external storage media storing data associated with the data group represented by the data group token;

wherein the processor is further configured to:
receive, from each medical institution and before the receiving of the user token from the client computer, a data group token associated with the patient, the data group token being a result of a combination of a set of data group tokens, each data group token from the set of data group tokens corresponding to a medical department belonging to the medical institution;
receive, from each medical institution, a pointer from a set of pointers associated with a location of the external server of a medical department in the medical institution;
combine the resulting set of data group tokens into the user token according to an index value derived from the received set of pointers, the index value being associated with the resulting user token; and
send the resulting user token to the client computer.

15. A computer program product having a non-transitory computer readable storage medium which stores code to control access to a complex datum which includes a set of data groups having data stored on a set of external storage media, the code including a set of instructions to:
receive, from a client computer over the network, a user token uniquely corresponding to and suppressing the identity of a user at the client computer;
map the user token to a set of data group tokens, each data group token in the set of data group tokens corresponding to a data group in the set of data groups and defining a level of access the user has to that respective data group, each data group in the set of data groups containing data which is stored on an external storage medium from the set of external storage media; and
send the set of data group tokens to the client computer over the network;

wherein a database is stored in the memory, the database including a lookup table containing a set of user tokens and a set of index values, each index value from the set of index values corresponding to a user token in the set of user tokens; and wherein mapping the user token to a set of data group tokens includes:
locating the user token in the lookup table,
finding the corresponding index value from the lookup table, and
obtaining the set of data group tokens from the corresponding index value;

wherein the index value corresponding to the user token represents a data partitioning scheme;

wherein obtaining the set of data group tokens includes partitioning the user token according to the data partitioning scheme represented by the corresponding index value;

wherein each data group token includes a set of data group token bits;

wherein the code includes further instructions to:
  send, before the receiving of the user token, a hash function to the client computer,
  for each data group token, generate a set of message authentication code (MAC) bits from an operation of the hash function on the data group token bits of that data group token, and
  for each data group token, combine the set of MAC bits with the data group token bits of that data group token; and wherein an application, at the client computer, of the hash function to a data group token of the set of data group tokens producing the set of MAC bits generated for the data group token implies that the data group token is valid.

16. A computer program product as in claim 15, wherein the user at the client computer is an entity attempting to access a patient's medical history within a medical institution having a set of medical departments, the medical history including a set of medical records, each medical record in the set of medical records belonging to a medical department;

wherein each data group token corresponds to a medical departments in the set of medical departments, each medical department having an external storage medium from the set of external storage media storing data associated with the data group represented by the data group token;

wherein the code further includes instructions to:
  receive, from each medical department and before the receiving of the user token from the client computer, a data group token associated with the patient;
  receive, from each medical department, a pointer from a set of pointers associated with a location of the external server of the medical department;
  combine the resulting set of data group tokens into the user token according to an index value derived from the received set of pointers, the index value being associated with the resulting user token; and
  send the resulting user token to the client computer.

17. A computer program product as in claim 15, wherein the user at the client computer is the patient associated with the medical history;

wherein each data group token corresponds to a medical institution in which the patient has a medical record, the medical institution belonging to a set of medical institutions, the medical record of the patient in the institution belonging to the set of medical records of the medical history, each medical department having an external storage medium from the set of external storage media storing data associated with the data group represented by the data group token;

wherein the code further includes instructions to:
  receive, from each medical institution and before the receiving of the user token from the client computer, a data group token associated with the patient, the data group token being a result of a combination of a set of data group tokens, each data group token from the set of data group tokens corresponding to a medical department belonging to the medical institution;
  receive, from each medical institution, a pointer from a set of pointers associated with a location of the external server of a medical department in the medical institution;
  combine the resulting set of data group tokens into the user token according to an index value derived from the received set of pointers, the index value being associated with the resulting user token; and
  send the resulting user token to the client computer.

* * * * *